United States Patent
Zimmerman et al.

(10) Patent No.: US 6,690,387 B2
(45) Date of Patent: Feb. 10, 2004

(54) TOUCH-SCREEN IMAGE SCROLLING SYSTEM AND METHOD

(75) Inventors: John Zimmerman, Ossining, NY (US); Jacquelyn Annette Martino, Cold Spring, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 214 days.

(21) Appl. No.: 10/034,375

(22) Filed: Dec. 28, 2001

(65) Prior Publication Data

US 2003/0122787 A1 Jul. 3, 2003

(51) Int. Cl.[7] ................................................ G09G 5/00
(52) U.S. Cl. ........................ 345/684; 345/784; 345/682
(58) Field of Search ................................ 345/173, 672, 345/676, 680–682, 684, 687, 688, 784, 785

(56) References Cited

U.S. PATENT DOCUMENTS

| | | | |
|---|---|---|---|
| 5,075,673 A | * 12/1991 | Yanker | 345/163 |
| 5,526,023 A | * 6/1996 | Sugimoto et al. | 345/173 |
| 5,850,211 A | * 12/1998 | Tognazzini | 345/158 |
| 5,864,330 A | * 1/1999 | Haynes | 345/856 |
| 6,384,845 B1 | * 5/2002 | Takaike | 345/786 |

* cited by examiner

Primary Examiner—Kent Chang
(74) Attorney, Agent, or Firm—Aaron Waxler

(57) ABSTRACT

Electronic image displays. of lists that extend beyond the vertical display dimension of the display screen, are displaced in the vertical direction by touching the screen with a finger and then moving the finger in the desired direction on the screen. In a natural manner the initial speed of displacement of the displayed image corresponds to the speed of motion of the finger along the screen. When the user's finger is disengaged from the screen, the system senses the disengagement and thereafter allows the vertical displacement speed of the image to decrease at a controlled rate. When it is desired to stop the motion of the image at a given point, or to make a selection from the displayed image, the system measures the length of time that the finger is in contact with the screen and the distance that the finger is moved during that time, to determine if a selection is desired or if it is desired only to stop displacement of the image. That is, a short term contact with the screen, say 500 ms or less, accompanied by little or no displacement on the screen, can be identified as an intended selection. while a longer contact with little or no accompanying displacement can be interpreted as being intended to stop the motion of the image without making a selection.

12 Claims, 2 Drawing Sheets

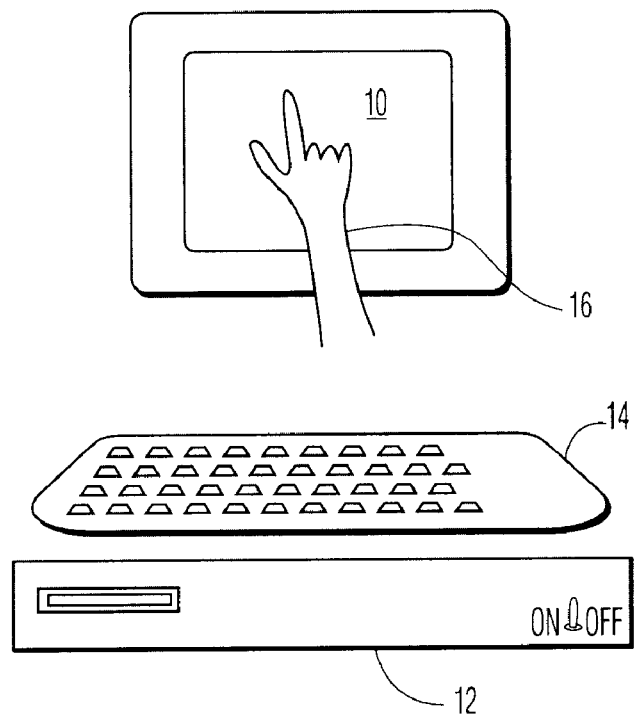
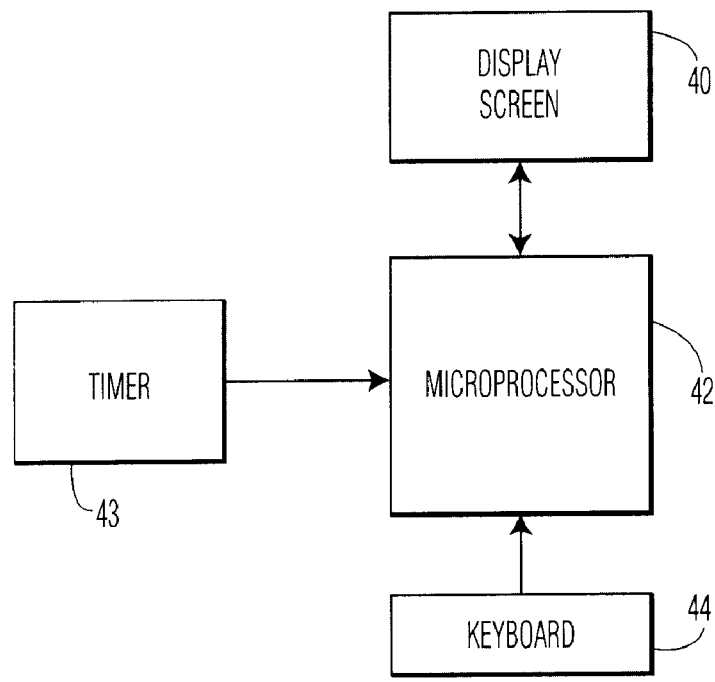
FIG. 2
FIG. 3

TOUCH-SCREEN IMAGE SCROLLING SYSTEM AND METHOD

BACKGROUND OF THE INVENTION

1. Field of the Invention

This invention relates generally to displays of information data in the form of sequential lines of symbols commonly comprising lists of words and numbers, and more specifically relates to the use and control of electronic forms of such displays.

2. Description of the Related Art

It has become well-known to display lists of words and numbers on electronic display screens for ready access by users. Often, such lists extend in length beyond the dimensions of the electronic screen, and in such cases it has further become well-known to cause the image of the list to "scroll" past the screen so that a line of text comprising words, numbers or other symbols, appears to travel from one edge of the screen to the other until a desired section of the list, or portion of a line, appears on the screen.

It is known that the systems and methods currently being used to control the scrolling motion of the screen image are subject to numerous limitations and disadvantages. For example, in one system a cursor may be positioned at one edge of the screen and then moved toward the opposite edge while holding down a selected "mouse" button, thereby engaging and "dragging" the screen image in a desired direction. It is well known that such displacement of the screen image is slow and cumbersome except for relatively slight relative movements. Another system in current use activates an automatic continuous "scrolling" motion of the image when the cursor is positioned on a specific portion of the image, while a selected mouse button is depressed. This requires holding down the selected button until the desired portion of the screen image is displayed. A related system in current use varies the speed of the scrolling motion in accordance with the position of the cursor relative to the edge of the screen. All of these cursor position-responsive control systems are subject to similar limitations of screen clutter, lack of aesthetic visual appeal, and the requirement for manipulation and handling of the mouse device.

SUMMARY OF THE INVENTION

The invention herein disclosed improves upon the scroll-like display of data on electronic display screens by making it possible for a user/viewer to access a desired portion of a long list of data and information by scrolling to the location of that portion rapidly and in a more natural manner than heretofore possible.

The present invention overcomes and avoids the limitations of known control systems for scrolling electronic displays by providing a touch-screen responsive system that imparts a scrolling motion to the displayed image in response to the motion of a finger in contact with the screen. The speed and direction of motion of the finger along the screen determines the initial speed and direction of motion for the image. After the finger separates from the screen, the image continues to move in the same direction at a gradually decreasing speed until motion is stopped manually by touching the screen without movement of the finger, or the speed decreases to zero, or to a predetermined minimum speed, or until the image reaches its "end". Alternatively, continued motion of the image may be achieved or again increased by repeating the "sweeping motion" of a the user's finger along the screen. Motion of the displayed image may be stopped manually by applying a finger to the screen without moving it along the surface of the screen for a finite period of time. If a finger is applied to the surface of the screen for a shorter period of time, for example for a period less than a minimum set time, the finger touch can be deemed to be a "selection" of an item or "thing" corresponding to the image displayed at the touched location. Still further, if the finger touch on the screen is made to move with the display, but at a slower rate than the then-current rate of movement, the display will be slowed to a rate corresponding to the motion of the finger at the movement that contact is broken.

This operation of the system of this invention is achieved by programming a microprocessor-based control system to displace the image on a screen display, such as the screen of a conventional cathode ray tube, in response to a finger touch on the screen and the direction of a finger motion along the surface of the screen at the initial speed of the finger motion. Thereafter, the speed of displacement is caused to decay at a selected rate (units of displacement per unit of time, or a function thereof), until the displacement finally stops (for example, due to having reached the end of the "scroll") or until it is stopped deliberately as explained herein.

In accordance with this invention, the scrolling motion of data on the display screen moves in a seemingly "natural" way, moving initially at a speed imparted by the motion of the user's finger, with the speed thereafter slowing at a constant rate until it ultimately comes to rest, unless it is terminated earlier.

Moreover, if the speed of scrolling is found to be slow at a point deemed to be too far before the desired location in the scroll, the scrolling speed may be increased as many times as possible by merely touching the screen again to impart "new" motion to the display.

At any desired point or time while a scrolling motion is in progress, it may be stopped entirely, again in a seemingly "natural" way, by merely touching one's finger to the screen while holding it substantially stationary for a predetermined period of time. The reason for requiring a predetermined time-period for stationary [i.e. no-motion] touch time is to assure that the timing mechanisms will have sufficient time to distinguish between a touch intended to stop the scrolling motion and a touch [shorter in time] intended to "select" or "mark" a particular item that is included in the scrolled data. "Touch marking" is a well-known feature of scrolled display technology at this time, but this invention discloses its use in combination with a new, and heretofore unknown, form of scrolling motion control.

These and other features and advantages of this invention will be made more apparent to those having skill in this art, by reference to the following specification considered in conjunction with the accompanying drawings, in which:

BRIEF DESCRIPTION OF THE DRAWINGS

FIG. 2 is simplified pictorial representation of a touch-screen image scrolling system in accordance with one embodiment of the invention of FIG. 1.

FIG. 3 is a simplified block diagram of another embodiment of a touch-screen image scrolling system in accordance with FIG. 1.

DETAILED DESCRIPTION OF THE PREFERRED EMBODIMENT

Figure 1:
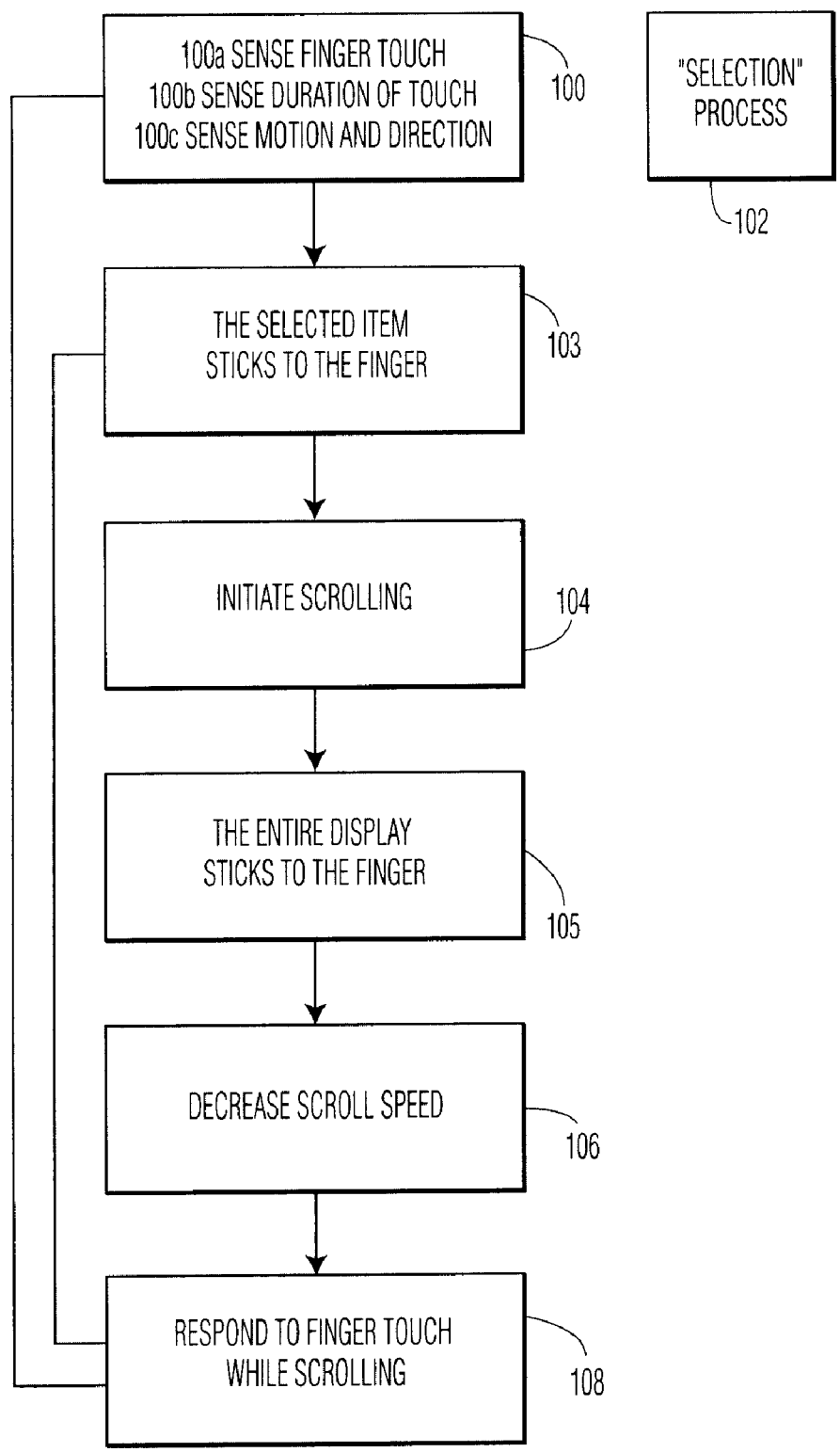
FIG. 1 is a flow-chart representing the sequential operations of a touch-screen image scrolling system in accordance with this invention.

In the following description, certain specific details of the disclosed embodiment such as architecture, interfaces and techniques, etc, are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Referring now to the block diagram of FIG. 1 of the drawings, the method of operating a touch-screen image scrolling system 10 (as shown in FIG. 1) in accordance with this invention may be seen to begin in step 100 with sensing the touch of a finger upon an electronic display screen 100a having a stationary data display, determining the period of time that the finger is in contact with the screen 100b, and determining if the finger moves or remains stationary. 100c. The technology and methodology for sensing and determining the appropriate values for information of the type herein disclosed is well-known to persons having skill in this art, and is not further described or discussed in this specification.

If no motion occurs and the touch contact continues for less than a predetermined minimum time, the touch is treated in step 100 as a "selection" of the data term touched, and the system continues with "selection" path 102. The operation of a selection path, beginning with, for example, highlighting of the term or icon touched, is well-known and is of no further concern in connection with the operation of the system of this invention. However, if the touch contact continues for more than the first predetermined minimum time, and the finger then moves after that time, the process of the invention will proceed to step 103, in which the "selected" item on the list will then "stick to the finger" so that the item can be repositioned on the list by the known process of "touch-dragging". This repositioning step can be very desirable to frequent users who may wish to cluster several preferred items in a given location. After an item has been repositioned in step 103, and finger contact with the screen is interrupted, the process will revert to "waiting" status. With advance reference to step 105, explained below, it should be noted here, that in this step it is a selected item, rather than the entire display, that "sticks to the finger."

In another feature, if no motion of the finger occurs while the screen is stationary, and the contact continues for less than a second minimum time which is less than the first minimum time by a readily measurable finite value, then step 100 ignores the contact and the system reverts to "waiting" status, awaiting further input signals.

However, if step 100 senses motion in association with the finger touch on the screen, during the finite period between the first predetermined time and the second, then the method of the invention proceeds to step 104, converting the speed and direction of motion of the touch into corresponding initial scrolling motion of the displayed data. And step 104 proceeds directly into step 106. Step 104 either proceeds to step 106, or diverges to step 105 depending upon whether the finger is removed from contact with the screen or continues in contact with the screen.

That is, if the finger touch of step 104 imparts movement to the display and the touch-contact is then broken, movement of the display continues in accordance with step 106. However, if contact with the screen is not broken, the method of the invention proceeds from step 104 to step 105, wherein the entire display [not just a selected item] in effect "sticks to the finger" so that the entire display can be moved up or down or back and forth, as the case may be, with the finger. If there is no finger motion at the time that finger contact with the screen is broken in step 105, the display will remain in the position it is in at that time without further motion, and the system will revert again to "waiting" status. In the alternative, if finger contact in step 105 is broken while the finger is in motion, the system of the invention proceeds to step 106, as described below.

In step 106, the timer function associated with the system of the invention measures time while the scrolling action continues and the system begins decreasing the scrolling speed at a controlled rate, from its initial value which is determined by the speed of the finger touch, toward zero or until the speed is reduced to any desired, predetermined minimum speed. It is assumed that most users of this system will prefer that the decrease in scrolling speed begin immediately after the start of scrolling. However, it should be recognized that the start of the decreasing speed function can, in fact, be delayed so as to begin at any time after the start of the scrolling motion. Incorporating a finite-time delay into the control system for utilization of this method is a simple technique well within the knowledge of those skilled in this art.

While the slowing scrolling motion continues, and after scrolling has terminated entirely, the system continues waiting for further input signals, to control the next operation of the system. However, in accordance with the invention, slowing of the scrolling speed continues until one of three events occurs: (1) slowing decreases the speed of the scroll to zero or to any preset minimum; or (2) an "end of scroll" data signal is received from the data source; or (3) a finger touch on the screen indicates that the scrolling is to be terminated. Regardless of the status of the slowing action, the method of this invention allows the system to react to the next user-initiated input signal at any time, following step 106.

Step 108 shows that the method of the invention reacts to a finger touch on the screen during or after scrolling by repeating, essentially, the functions of step 100. That is, in step 108, the system senses the touch of a finger 100a on the electronic display screen, determines the period of time 100b that the finger is in contact with the screen, and determines if the finger moves or remains stationary. 100b. If the touch is stationary and the contact continues for less than a predetermined minimum time, the finger touch is treated in step 108 as both (1) a "selection" of the data term touched, and (2) an instruction to terminate the scrolling motion. In this case, scrolling motion terminates and the system reverts to the "selection" path 102, previously mentioned. On the other hand, if the touch is stationary but the contact does not continue for more than the minimum time, the method treats the touch as an instruction to terminate the scrolling motion only, and there is no resulting "selection" of any data listing that may have been touched. When scrolling motion terminates under these circumstances, the method reverts to the state that exists before the beginning of step 100, waiting for "instructions" in the form of input signals; i.e. awaiting either selection of a displayed item or initiation of scrolling motion.

Once again it should be emphasized that the duration of contact for a stationary finger touch on the screen serves as the distinction between a "selection" touch and a "stop scrolling" touch. Although it has been stated above, that a relatively long-term finger touch while scrolling motion is taking place serves as both a "selection" and a "stop motion" signal, it will be obvious that the method could be set up easily so that a finger touch during the scrolling process would act solely as a "stop motion" signal regardless of the length of the touch; this would protect against the possibility of unintended "selections" resulting from inadvertently long touches that were intended only to "stop" the scrolling.

In contrast to stationary touching in step 108, if the system senses motion of the finger touch on the screen, the method reverts to step 104, again converting the speed and direction of motion of the touch into scrolling motion of the displayed data and restarting the scrolling process. As before, step 104 then proceeds directly into step 106.

In the embodiment of the system of this invention illustrated in FIG. 2, the system is shown to comprise a simple personal computer apparatus having a display screen 10, a central processing unit 12 and a keyboard 14 for inputting manual instruction to the processing unit 12. In accordance with convention, it will be understood that processing unit 12 includes an internal electronic memory unit (not shown) of conventional design and capabilities. Accordingly, for the purposes of this disclosure, the internal memory unit may be assumed to be the source of a scrollable data display capable of appearing on display screen 10 which is accessible to a hand or stylus device, here stylistically represented by the outline of a hand 16.

In use, the computer is set up in well-known manner to display the scrollable data on screen 10, and a hand/finger or stylus 16 is touched to the screen and moved down along the screen to impart an initial downward "scrolling" motion to the data display. Software in the computer interactively responds to the contact with the screen to create the desired displacement motion of the display and the internal timer facility now inherent in such computer apparatus, in cooperation with the programming of processing unit 12 responds to the start of motion by gradually decreasing the speed of displacement, as explained previously herein. When a desired point in the display is seen or approached, the user may apply a hand or stylus 16 to the screen to terminate the scrolling motion. Because the scrolling motion does not involve any moving parts with real or simulated mass, it is possible to stop the motion of the display instantly, without any difficulty or concern for inertial force consequences.

Accordingly, it will now be understood that the system and method of this invention facilitates a rapid, convenient and natural-feeling approach to accessing a scroll-like display of data on a computer screen.

In the embodiment represented in FIG. 3, the system of this invention is shown to comprise the essential elements of the computer apparatus of FIG. 2 without having the configuration of a computer. That is, the basic components of the system of this invention are here show to comprise a microprocessor 42 which is in turn coupled to a keyboard 44, a timer means 43 and a display screen 40. Each of these components functions in the same manner as its counterparts in the embodiment of FIG. 2, with microprocessor 42 and the associated timer means 43 together, here serving the same function as central processing unit 12 in FIG. 2.

Although a preferred embodiment of the invention has been illustrated and described, those having skill in this art will recognize that various other forms and embodiments now may be visualized readily without departing significantly from the spirit and scope of the invention disclosed herein and set forth in the accompanying claims.

What is claimed is:

1. An improved touch-screen image scrolling system, comprising:

an electronic image display screen;

a microprocessor coupled to said display screen to display information thereon and to receive interactive signals therefrom;

timer means associated with said microprocessor to provide timing capacity therefor;

a source of scroll format data capable of display on said display screen;

a keyboard coupled to said microprocessor to provide input control signals thereto;

finger touch program instructions associated with said microprocessor for sensing the speed, direction and time duration of a finger touch contact with said display screen;

scrolling motion program instructions associated with said microprocessor responsive to said duration of said finger touch contact such that, when said duration exceeds a first given preset minimum time and is accompanied by motion along the surface of said screen followed by separation of said finger touch from said screen, a scroll format display on said screen is caused to begin to scroll in said sensed direction and at said sensed initial speed;

time decay program instructions associated with said microprocessor for reducing the rate of scrolling displacement on said display screen at a given rate until motion is terminated;

stopping motion program instructions associated with said microprocessor for terminating scrolling displacement of the image on said screen upon first occurrence of any signal in the group of signals comprising:

(a) a substantially stationary finger touch on the screen enduring for a period longer than a preset minimum time, and (b) an end-of-scroll signal received from said scroll format data source.

2. The improved touch-screen image scrolling system of claim 1, wherein said scrolling motion program instructions further comprise instructions to move said display in correspondence with movement of the finger touch, in response to movement following a touch having a stationary duration greater than said first preset given minimum time and less than a second given preset minimum time.

3. The improved touch-screen image scrolling system of claim 1, wherein said scrolling motion program instructions further comprise instructions to move a touch-selected item relative to the stationary display in correspondence with movement of said finger touch, in response to motion following a touch having a stationary duration greater than said second given preset minimum time.

4. The improved touch-screen image scrolling system of claim 1, wherein said group of signals for terminating scrolling, displacement of the image on said display screen further comprises (a) a signal indicating that the rate of scrolling displacement on said screen has decayed to a value below a predetermined given value.

5. The improved touch-screen image scrolling system of claim 1, wherein said microprocessor, and said timer means together comprise a processing unit of a conventional computer.

6. The improved touch-screen image scrolling system of claim 5, wherein said source of scroll format data capable of display on said display screen comprises part of the memory of said conventional computer.

7. An improved touch-screen image scrolling system, comprising:

an electronic image display screen;

a computer apparatus coupled to said display screen to display information thereon and to receive interactive signals therefrom;

timer means within said computer apparatus to provide timing capacity therefor;

said computer apparatus having capacity to store scroll format data capable of display on said display screen;

a keyboard coupled to said computer apparatus to provide input control signals thereto;

finger touch program instructions associated with said computer apparatus for sensing the speed, direction and time duration of a finger touch contact with said display screen;

scrolling motion program instructions associated with said computer apparatus responsive to said duration of said finger touch contact such that, when said duration exceeds a preset minimum time and is accompanied by motion along the surface of said screen, a scroll format display on said screen is caused to begin to scroll in the sensed direction and at the sensed initial speed;

time decay program instructions associated with said computer apparatus for reducing the rate of scrolling displacement on said display screen at a given rate until motion is terminated;

stopping motion program instructions associated with said computer apparatus for terminating scrolling displacement of the image on said screen upon first occurrence of any signal in the group of signals comprising:
 (a) a substantially stationary finger touch on the screen enduring for a period longer than a preset minimum time, and
 (b) an end-of-scroll signal received from said scroll format data source.

8. An improved touch-screen image scrolling system, comprising:

an electronic image display screen;

a microprocessor coupled to said display screen to display information thereon and to receive interactive signals therefrom;

timer means associated with said microprocessor to provide timing capacity therefor;

a source of scroll format data capable of display on said display screen;

a keyboard coupled to said microprocessor to provide input control signals thereto;

finger touch program instructions associated with said microprocessor for sensing the speed, direction and time duration of a finger touch contact with said display screen;

scrolling motion program instructions associated with said microprocessor responsive to said duration of said finger touch contact such that, when said duration exceeds a first given preset minimum time, and is less than a second given preset minimum that is greater than said first minimum, and is accompanied by motion along the surface of said screen, a scroll format display on said screen is caused to begin to scroll in the sensed direction and at the sensed initial speed;

said scrolling motion program instructions further comprising instructions to move a touch-selected item relative to the stationary display in correspondence with movement of the finger touch, in response to motion following a touch having a stationary duration greater than said second given preset minimum time;

said scrolling motion program instructions still further comprising instructions to move said display in correspondence with movement of the finger touch, in response to motion following a touch having a stationary duration greater than said first given preset minimum time and less than said second given preset minimum time;

time decay program instructions associated with said microprocessor for reducing the rate of scrolling displacement on said display screen at a given rate until motion is terminated;

stopping motion program instructions associated with said microprocessor for terminating scrolling displacement of the image on said screen upon first occurrence of any signal in the group of signals comprising:
 (a) a substantially stationary finger touch on the screen enduring for a period longer than a preset minimum time, and
 (b) an end-of-scroll signal received from said scroll format data source.

9. An improved method of controlling the scroll-like display of data on an electronic display screen, said method comprising the steps of:

sensing the duration of finger touch contact time with an electronic display screen having scrollable data displayed thereon;

sensing the speed and direction of motion of said finger touch contact with said display screen;

initiating scrolling motion of said scrollable data on said display screen in said sensed direction and at said sensed speed;

slowing the speed of said scrolling motion from the initiated speed thereof, at a predetermined rate; and terminating said scrolling motion when one of the conditions comprising the following group of conditions is sensed:
 (a) a substantially stationary finger touch having a finite duration is sensed;
 (b) an end-of-scroll signal is sensed.

10. The improved method of controlling the scroll-like display of data on an electronic display screen, in accordance with claim 7, wherein said group of conditions to be sensed for terminating said scrolling motion further comprises: the speed of said scrolling motion on said screen slows to a value below a predetermined given value.

11. The improved method of controlling the scroll-like display of data on an electronic display screen in accordance with claim 9, wherein said method comprises the further step of sensing a finger touch on said screen having a duration greater than said first given preset minimum time and less than a second given preset minimum time which is greater than said first given time and then moving said display in correspondence with movement of the finger touch.

12. The improved method of controlling the scroll-like display of data on an electronic display screen. in accordance with claim 9, wherein said method comprises the further step of sensing a stationary finger touch on said screen having a duration greater than a second preset given minimum time which is greater than said first given preset time and then moving a touch-selected item relative to the stationary display in correspondence with movement of the finger touch.

* * * * *